United States Patent
Huang et al.

(10) Patent No.: US 8,905,552 B2
(45) Date of Patent: Dec. 9, 2014

(54) DUST-PROOF STRUCTURE OF PROJECTOR

(75) Inventors: Kai Huang, New Taipei (TW);
Ming-Chih Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/480,472

(22) Filed: May 25, 2012

(65) Prior Publication Data
US 2013/0128237 A1 May 23, 2013

(30) Foreign Application Priority Data
Nov. 18, 2011 (TW) .............................. 100142455 A

(51) Int. Cl.
*G03B 21/28* (2006.01)
*G03B 21/16* (2006.01)
*G03B 21/14* (2006.01)

(52) U.S. Cl.
CPC .............. *G03B 21/16* (2013.01); *G03B 21/145* (2013.01)
USPC ........................................... 353/84; 359/889

(58) Field of Classification Search
USPC ........................................... 353/84; 359/889
See application file for complete search history.

(56) References Cited

U.S. PATENT DOCUMENTS

2003/0124752 A1* 7/2003 Wei et al. .......................... 438/22
2011/0255060 A1* 10/2011 Shih et al. ......................... 353/84

FOREIGN PATENT DOCUMENTS

CN          101957174 A          1/2011

* cited by examiner

*Primary Examiner* — Francis M Legasse, Jr.
*Assistant Examiner* — Jerry Brooks
(74) *Attorney, Agent, or Firm* — Novak Druce Connolly Bove + Quigg LLP

(57) ABSTRACT

A dust-proof structure of a projector includes a color wheel module, an air diversion panel, and a circuit board. The color wheel module has a motor and a color wheel. The motor drives the color wheel by an axle to rotate. The air diversion panel is located on the circuit and positioned under the motor. The air diversion panel has an opening, a dust exit, and a dust collecting trough. The opening is positioned between the dust exit and the dust collecting trough. The circuit board has a sensor, which is placed in the opening of the air diversion panel. The dust exit and the dust collection trough of the air diversion panel prevent the sensor from dust aggregation.

5 Claims, 3 Drawing Sheets

DUST-PROOF STRUCTURE OF PROJECTOR

BACKGROUND

1. Technical Field

The disclosure is related to a dust-proof structure of a projector, and particularly to a dust-proof structure having an air diversion panel configured for a color wheel module of the projector.

2. Description of Related Art

Light sources of projectors are installed with the color wheels and sensors to control the projected colors. Current light sources, such as tungsten-halogen lamps, metal-halogen lamps, high-pressure mercury-vapor lamps, xenon lamps, light-emitting diodes, or laser diodes, generate heat during operation. When the projectors are cooled down by the air flow generated by fans, dust in the air aggregate gradually on the sensors resulting in the sensor becoming ineffective. The ineffective sensors cause failures in controlling the color wheels and chromatic aberration of the projected images. Furthermore, the aggregation of dust makes the color wheels and the projectors unworkable. A structure that effectively prevents aggregation of dust is desirable.

BRIEF DESCRIPTION OF THE DRAWINGS

The components in the drawings are not necessarily drawn to scale, the emphasis instead being placed upon clearly illustrating the principles of a dust-poof structure of a projector. Moreover, in the drawings, like reference numerals designate corresponding parts throughout the several views.

DETAILED DESCRIPTION

The disclosure will be described with references to the accompanying diagrams.

Figure 1:
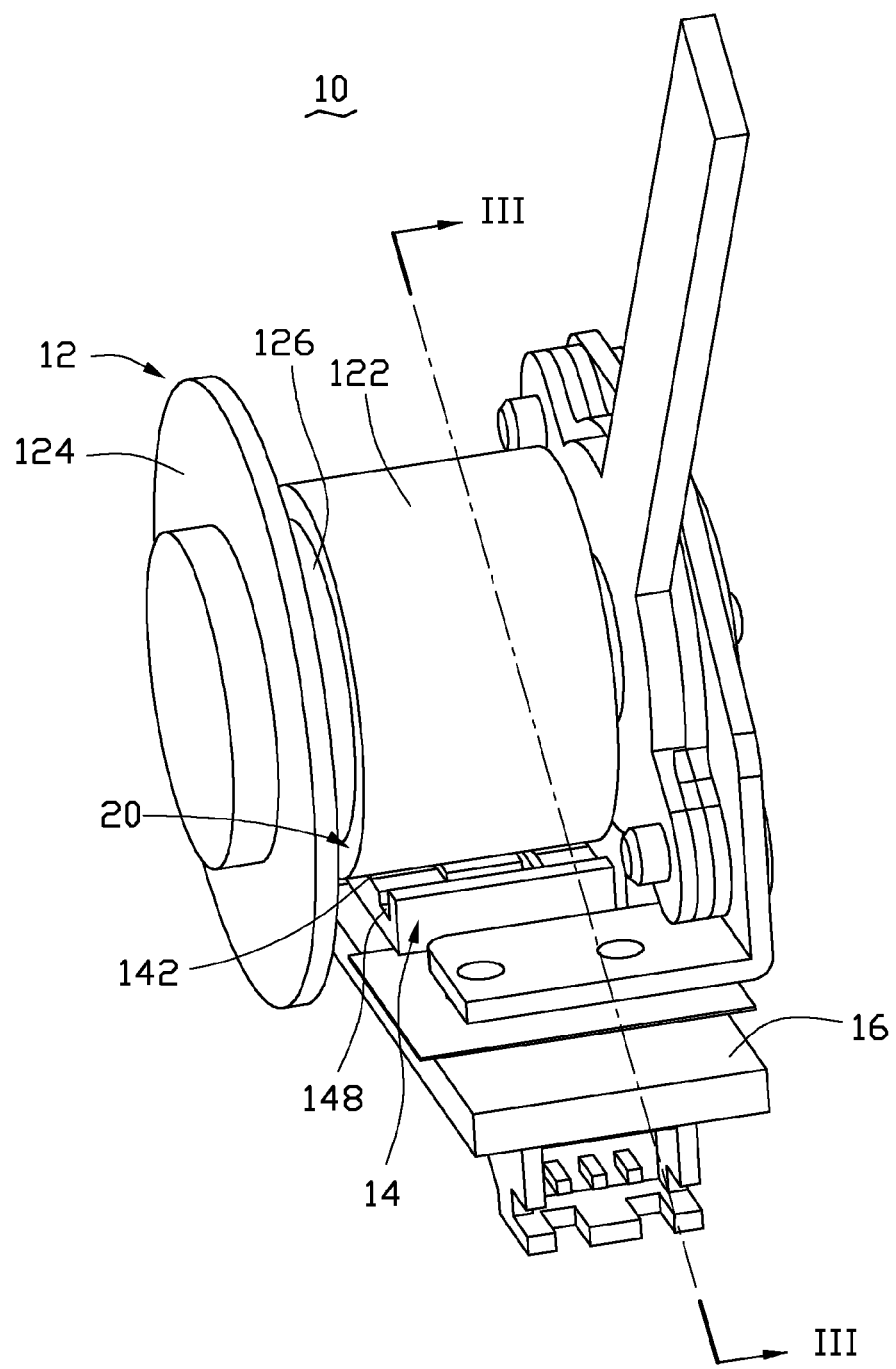
FIG. 1 is a schematic diagram illustrating a dust-poof structure of a projector of the disclosure.

FIG. 1 shows a dust-proof structure 10 of a projector that includes a color wheel module 12, an air diversion panel 14, and a circuit board 16. The color wheel module 12 has a motor 122 and a color wheel 124. The motor 122 has an axle 126 engaged with the color wheel 124. The color wheel 124 is synchronized with the rotation of the axle 126 and the motor 122. The color wheel 124 includes a plurality of color filters, for example, an assembly of red color filters, blue color filters and green color filters (not show), for splitting white lights from the light sources. The air diversion panel 14 is positioned on the circuit board 16 and positioned under the motor 122. The top surface of the air diversion panel 14 is an air guiding surface 142 facing a circumferential surface of the motor 122. An air pathway is formed between the air guiding surface 142 and the circumferential surface of the motor 122.

Figure 2:
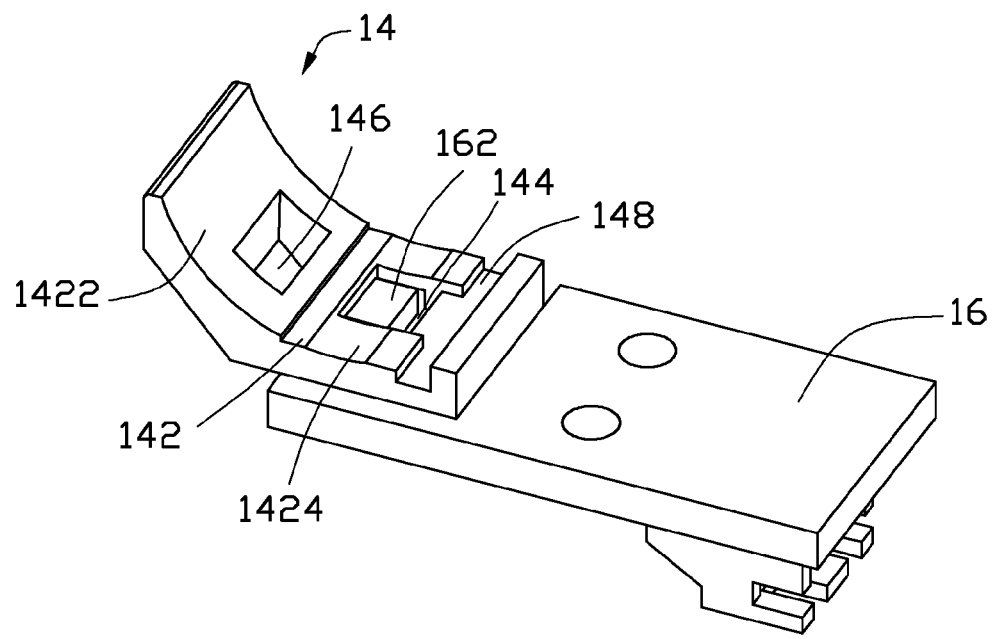
FIG. 2 is a schematic diagram illustrating the assembly of an air diversion panel and a circuit board of the dust-proof structure.

The assembly of the air diversion panel 14 and the circuit board 16 is shown in FIG. 2. The air diversion panel 14 has an opening 144, a dust exit 146 to repel dust, and a dust collecting trough 148. The opening 144 is positioned between the dust exit 146 and the dust collecting trough 148. The air guiding surface 142 of the air diversion panel 14 includes an arc surface 1422 and a flat surface 1424. The arc surface 1422 extends from the flat surface 1424 and is curved upward and positioned beside the motor 122 (see FIG. 3 also). The flat surface 1424 is located under the motor 122. The opening 144 is defined in the flat surface 1424 close to the arc surface 1422. The dust exit 146 is defined in the arc surface 1422. The dust collecting trough 148 is next to the opening 1424 away from the arc surface 1422. The air diversion panel 14 is made of a plastic material, such as polycarbonate (PC). The air diversion panel 14 is bonded to the circuit board 16 with an ultraviolet (UV) glue. The circuit board 16 has a sensor 162, which is positioned in the opening 144 of the air diversion panel 14 under the motor 122. The function of the sensor 162 is to detect the rotating status of the axle 126 and the motor 122 and transmit corresponding signals to a control system of the projector. The control system monitors the color wheel module 12 to split lights for maintaining the color of the projected images. If the top surface of the sensor 162 is covered by the dust, the operation of the sensor 162 is ineffective which may result in color distortion of the projected images. In a worse condition, the projector may not work effectively.

Figure 3:
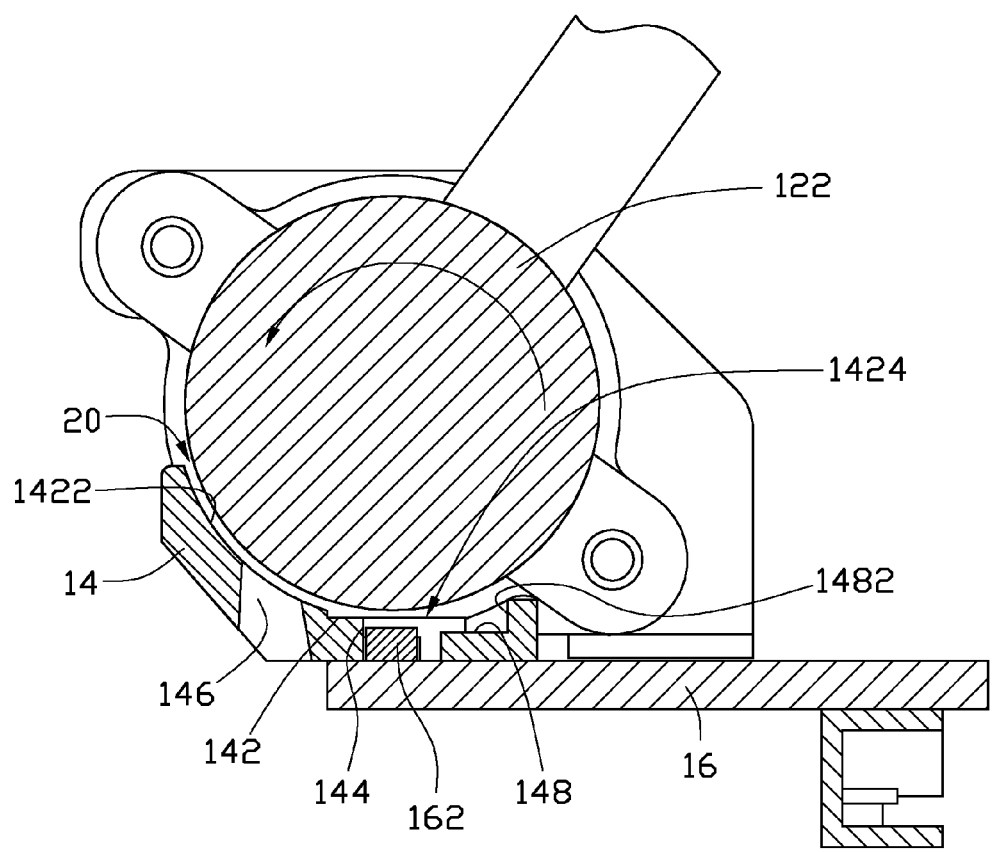
FIG. 3 is a cross-sectional diagram of FIG. 1 along line III-III.

FIG. 3 shows the air diversion panel 14 positioned under the motor 122. The arc surface 1422 is positioned beside the motor 122, and accordingly the dust exit 146 is positioned along the tangent line of the motor 122. High speed rotation of the motor 122 and the axle 126 causes air to be disturbed and an air flow is formed in the air pathway 20, which is positioned between the air guiding surface 142 and the circumferential surface of the motor 122. The air flow is guided to pass through the arc surface 1422 and then the flat surface 1424. Most air of the air flow leaves the air diversion panel 14 through the dust exit 146, and dust in the flowing air is expelled in this way. The remaining air flow is guided to the flat surface 1424 and passes through the opening 144 to the dust collecting trough 148. The sensor 162 in the opening 144 has a top surface positioned lower than the flat surface 1424 to prevent dust aggregation coming with the air flow. The air diversion panel 14 has a dust blocking wall 1482 located beside the dust collecting trough 148. The top surface of the dust blocking wall 1482 is positioned higher than the flat surface 1424. The remaining air flow is held and blocked by the dust blocking wall 1482, and the rest of the dust in the remaining airflow is collected by the dust collecting trough 148. In addition, the air flow passes through the sensor 162 helps to remove the top surface of the sensor 162 to maintain the performance of the projector. Therefore, the sensor 162 is well protected from dust aggregation.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A dust-proof structure of a projector, the dust-proof structure comprising:
   a circuit board;
   an air diversion panel positioned on the circuit board; and
   a color wheel module positioned above the air diversion panel;
   the color wheel comprising:
     a color wheel; and
     a motor comprising an axle engaged with the color wheel, wherein the color wheel is synchronized with the rotating motion of the motor and the axle;
   the air diversion panel comprising an air guiding surface surrounding the circumferential surface of the motor and an bottom surface opposite to the air guiding surface, an air pathway being formed between the air guiding surface and the circumferential surface of the motor, the air guiding surface comprising:
  a flat surface opposite to the circuit board; and
  an arc surface extending from the flat surface away from the circuit board;
the air diversion panel defining:
  an opening through the flat surface and the bottom surface;
  a dust exit through the act surface and the bottom surface; and
  a dust collecting trough in the flat surface, wherein the dust exit, the opening, and the dust collecting trough are arranged along a circumferential direction and a rotating direction of the motor;
wherein the circuit board ends between the opening and the dust exit, the dust exit is unblocked by the circuit board, the circuit board comprises a sensor placed in the opening.

2. The dust-proof structure of claim 1, wherein the air diversion panel further comprises a dust blocking wall extending up from the flat surface at a side of the dust collection trough opposite to the opening.

3. The dust-proof structure of claim 1, wherein the sensor is lower than the flat surface.

4. The dust-proof structure of claim 1, wherein the air diversion panel is made of a plastic material, and the plastic material comprises polycarbonate (PC).

5. The dust-proof structure of claim 1, wherein the air diversion panel is bonded to the circuit board with an ultraviolet glue.

* * * * *